(12) United States Patent
Nayak et al.

(10) Patent No.: US 9,836,515 B1
(45) Date of Patent: Dec. 5, 2017

(54) SYSTEMS AND METHODS FOR ADDING ACTIVE VOLUMES TO EXISTING REPLICATION CONFIGURATIONS

(71) Applicant: Veritas Technologies LLC, Mountain View, CA (US)

(72) Inventors: Yatin Nayak, San Jose, CA (US); Satyendra Thakur, Sunnyvale, CA (US)

(73) Assignee: Veritas Technologies LLC, Mountain View, CA (US)

( * ) Notice: Subject to any disclaimer, the term of this patent is extended or adjusted under 35 U.S.C. 154(b) by 595 days.

(21) Appl. No.: 14/145,282

(22) Filed: Dec. 31, 2013

(51) Int. Cl.
*G06F 7/00* (2006.01)
*G06F 17/00* (2006.01)
*G06F 17/30* (2006.01)

(52) U.S. Cl.
CPC .. *G06F 17/30575* (2013.01); *G06F 17/30067* (2013.01)

(58) Field of Classification Search
CPC ............... G06F 17/30067; G06F 17/30575
USPC ......................................... 707/634
See application file for complete search history.

(56) References Cited

U.S. PATENT DOCUMENTS

| | | | | |
|---|---|---|---|---|
| 6,732,124 B1* | 5/2004 | Koseki | ............... | G06F 11/1435 |
| 7,082,446 B1* | 7/2006 | Bottomley | ........ | G06F 17/30578 707/610 |
| 2003/0208511 A1* | 11/2003 | Earl | ................. | G06F 17/30581 |
| 2005/0071710 A1* | 3/2005 | Micka | ................. | G06F 11/2058 714/6.12 |
| 2005/0138306 A1* | 6/2005 | Panchbudhe | ....... | G06F 11/2097 711/162 |
| 2006/0020754 A1* | 1/2006 | Suzuki | .................. | G06F 3/0605 711/114 |
| 2006/0069865 A1* | 3/2006 | Kawamura | ......... | G06F 11/2064 711/114 |
| 2010/0228913 A1* | 9/2010 | Czezatke | ............ | G06F 11/1451 711/112 |

* cited by examiner

*Primary Examiner* — Kris Mackes
*Assistant Examiner* — Lin Lin Htay
(74) *Attorney, Agent, or Firm* — FisherBroyles LLP

(57) ABSTRACT

A computer-implemented method for adding active volumes to existing replication configurations may include (1) identifying a new volume to be added to an existing replication configuration that replicates a plurality of volumes to a remote storage device, (2) using interchangeable bitmaps to perform an initial synchronization of the new volume with the remote storage device before replicating the new volume to the remote storage device as part of the existing replication configuration, (3) determining that a replication log associated with the replication configuration is capable of flagging future writes by the application to the new volume without overflowing, and, upon making that determination, (4) replicating the new volume to the remote storage device as part of the existing replication configuration. Various other methods, systems, and computer-readable media are also disclosed.

20 Claims, 8 Drawing Sheets

SYSTEMS AND METHODS FOR ADDING ACTIVE VOLUMES TO EXISTING REPLICATION CONFIGURATIONS

BACKGROUND

Storage systems frequently use data redundancy mechanisms to ensure data integrity, fault-tolerance, and availability. One approach to data redundancy involves copying or replicating changes made to data stored on a primary storage system to a backup (and often remote) storage system. Replicating data in this manner may prevent downtime and/or data loss in the event of hardware failures and/or disasters.

Unfortunately, traditional replication methods often provide inefficient means for adding active volumes to an existing replication configuration. For example, because a volume to be added may be in active use by an application, adding a copy of the active volume to the replication configuration may require offlining the application to perform an initial block-level synchronization of the active volume to the backup storage system to ensure data consistency. This initial block-level synchronization can be time-consuming and tedious, potentially consuming extra network bandwidth and computing resources on the primary storage system and increasing the time in which the replication configuration remains inconsistent.

The instant disclosure, therefore, identifies a need for improved systems and methods for adding active volumes to existing replication configurations.

SUMMARY

As will be described in greater detail below, the instant disclosure generally relates to systems and methods for adding volumes that are in active use by applications to existing replication configurations without offlining the applications. In one example, a computer-implemented method for performing such a task may include (1) identifying a new volume to be added to an existing replication configuration that replicates a plurality of volumes to a remote storage device, (2) using interchangeable bitmaps to perform an initial synchronization of the new volume with the remote storage device before replicating the new volume to the remote storage device as part of the existing replication configuration, (3) determining that a replication log associated with the replication configuration is capable of flagging future writes by the application to the new volume without overflowing, and, upon making that determination, (4) replicating the new volume to the remote storage device as part of the existing replication configuration. In this example, the new volume represents an active volume that is being actively written to by at least one application, and the initial synchronization occurs while the new volume is being actively written to by the application.

In one embodiment, a system for implementing the above-described method may perform the initial synchronization by (1) flagging each region of the new volume in a first bitmap, (2) transferring each region of the new volume that is flagged in the first bitmap to the remote storage device, (3) while transferring each region of the new volume that is flagged in the first bitmap, flagging, in a second bitmap, each region of the new volume that is written to by the application, and, (4) upon transferring each region of the new volume that is flagged in the first bitmap, clearing the first bitmap and transferring each region of the new volume that is flagged in the second bitmap to the remote storage device. This embodiment may further include, (1) while transferring each region of the new volume that is flagged in the second bitmap, flagging, in the first bitmap, each region of the new volume that is written to by the application, and, (2) upon transferring each region of the new volume that is flagged in the second bitmap, clearing the second bitmap and transferring each region of the new volume that is flagged in the first bitmap to the remote storage device. In some embodiments, while each region of the new volume that is flagged in the first bitmap is being transferred, each region of the new volume that is written to by the application is flagged in the second bitmap. In one embodiment, at least a portion of the initial synchronization may be repeated until the replication log is determined to be capable of flagging future writes by the application to the new volume without overflowing.

In one embodiment, a system for implementing the above-described method may base the determination that the replication log is capable of flagging future writes at least in part on the number of synchronization cycles that have occurred. Additionally, or alternatively, a system for implementing the above-described method may base the determination at least in part on the number of flagged regions of the new volume that still need to be transferred to the remote storage device to complete the initial synchronization.

In some embodiments, a system for implementing the above-described method may determine, prior to determining that the replication log is capable of flagging future writes by the application to the new volume without overflowing, that (1) the replication log is not currently capable of flagging future writes by the application to the new volume without overflowing and (2) may use the interchangeable bitmaps to synchronize the new volume with the remote storage device until the replication log is determined to be capable of flagging future writes by the application to the new volume without overflowing. In one example, the determination that the replication log is not currently capable of flagging future writes by the application to the new volume without overflowing is made by flagging, in the replication log, each region of the new volume that is flagged in one of the interchangeable bitmaps during the initial synchronization and determining that the replication log has overflown.

In one embodiment, a system for implementing the above-described method may replicate the new volume to the remote storage device as part of the existing replication configuration by, upon determining that the replication log is capable of flagging future writes by the application to the new volume without overflowing, (1) marking an initial checkpoint in the replication log, and, after marking the initial checkpoint in the replication log, (2) flagging, in the replication log, future writes to the new volume by the application, then, upon completion of the initial synchronization, (3) marking a terminal checkpoint in the replication log, (4) scanning the replication log between the initial checkpoint and the terminal checkpoint for any flag associated with the new volume, and (5) transferring, to the remote storage device, each region of the new volume that is flagged in the replication log between the initial and terminal checkpoints.

In one example, a system for adding active volumes to existing replication configurations may include (1) an identification module, stored in memory, that identifies a new volume to be added to an existing replication configuration, (2) a synchronization module, stored in memory, that uses interchangeable bitmaps to perform an initial synchronization of the new volume with the remote storage device, (3)

a determination module, stored in memory, that determines that a replication log associated with the replication configuration is capable of flagging future writes by the application to the new volume without overflowing, (4) a replication module, stored in memory, that replicates the new volume to the remote storage device as part of the existing replication configuration, and (5) a processor configured to execute the identification module, the synchronization module, the determination module, and the replication module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a new volume to be added to an existing replication configuration that replicates a plurality of volumes to a remote storage device, (2) use interchangeable bitmaps to perform an initial synchronization of the new volume with the remote storage device before replicating the new volume to the remote storage device as part of the existing replication configuration, (3) determine that a replication log associated with the replication configuration is capable of flagging future writes by the application to the new volume without overflowing, and (4) replicate the new volume to the remote storage device as part of the existing replication configuration.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
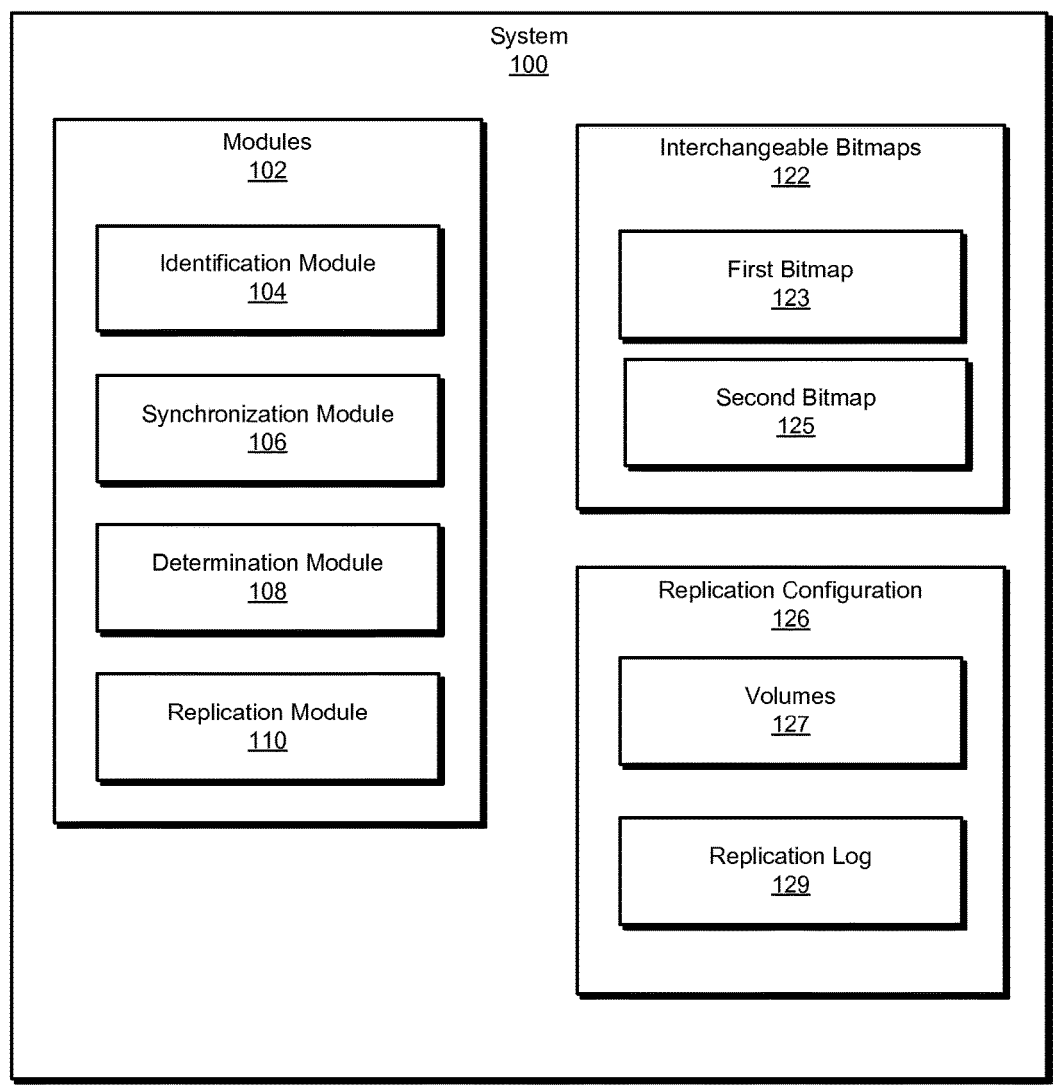
FIG. 1 is a block diagram of an exemplary system for adding active volumes to existing replication configurations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for adding active volumes to existing replication configurations. As will be explained in greater detail below, by using interchangeable bitmaps to perform an initial synchronization of an actively used volume with a remote storage device before replicating the volume to the remote storage device as part of an existing replication configuration, the systems and methods described herein may enable system administrators to add volumes that are in active use by applications to existing replication configurations without offlining the applications. This may, in turn, both reduce the time in which the existing replication configuration remains inconsistent and consume fewer system resources. In addition, by performing this initial synchronization in parallel with the replication of the volumes that are part of the existing replication configuration, the systems and methods described herein may avoid negatively impacting the data consistency of the existing replication configuration.

Figure 2:
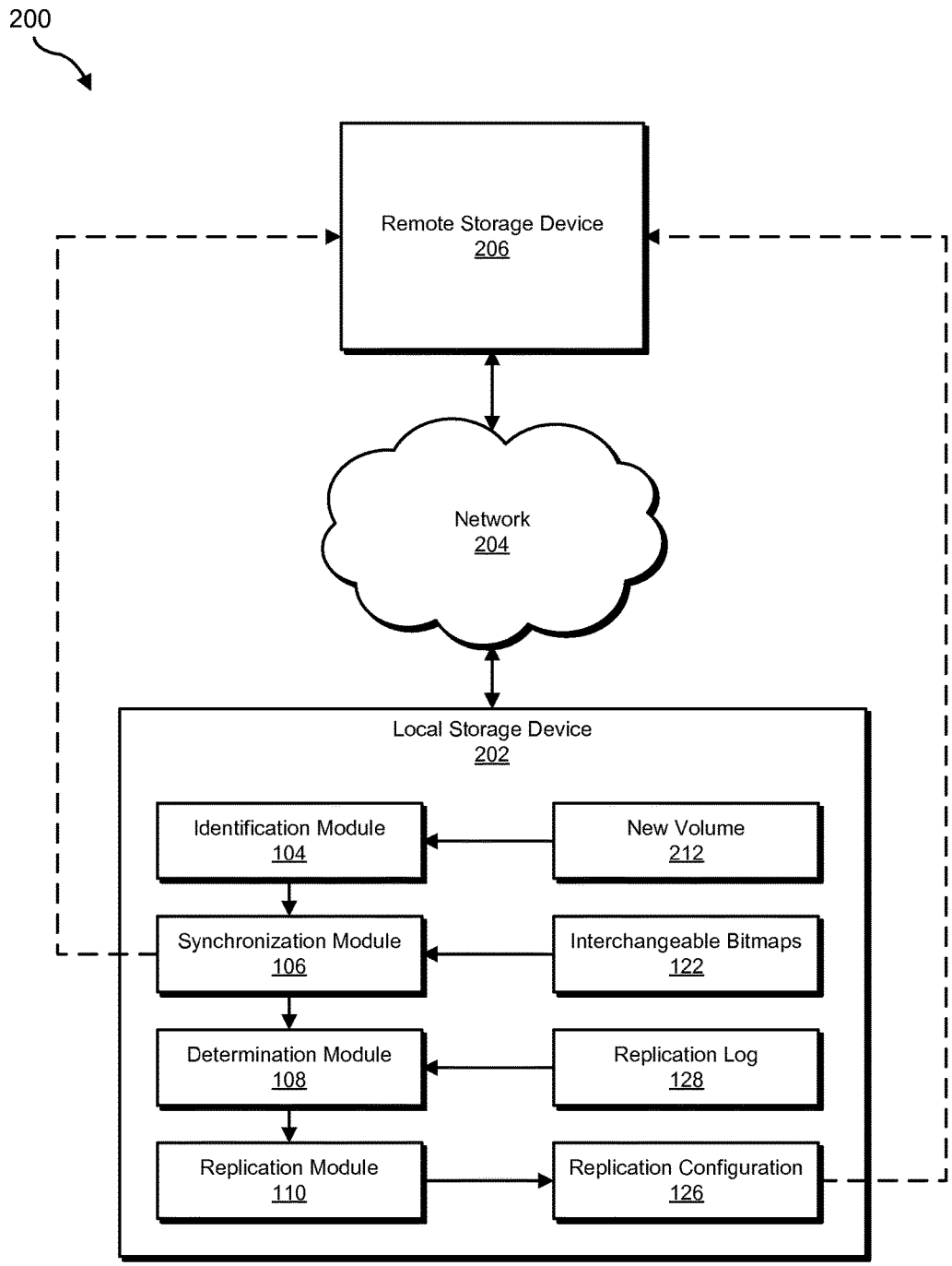
FIG. 2 is a block diagram of an additional exemplary system for adding active volumes to existing replication configurations.

The following will provide, with reference to FIGS. 1-2, detailed descriptions of exemplary systems for adding active volumes to existing replication configurations. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for adding active volumes to existing replication configurations. As illustrated in this figure, exemplary system 100 may include one or more modules 102 for performing one or more tasks. For example, and as will be explained in greater detail below, exemplary system 100 may include an identification module 104 that identifies a new volume to be added to an existing replication configuration. Exemplary system 100 may also include a synchronization module 106 that performs an initial synchronization of the new volume with a remote storage device.

In addition, and as will be described in greater detail below, exemplary system 100 may include a determination module 108 that determines that the replication configuration is capable of flagging future writes by an application to the new volume without overflowing. Exemplary system 100 may also include a replication module 110 that replicates the new volume to the remote storage device as part of the existing replication configuration. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., local storage device 202 and/or remote storage device 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include a plurality of interchangeable bitmaps 122. As detailed below, interchangeable bitmaps 122 may be used to perform an initial synchronization of a new volume while the new volume is being actively written to by an application. Exemplary system 100 may also include a replication configuration 126. As detailed below, replication configuration 126 may be used to replicate a plurality of volumes to a remote storage device.

Exemplary system 100 in FIG. 1 may be implemented in a variety of ways. For example, all or a portion of exemplary system 100 may represent portions of exemplary system 200 in FIG. 2. As shown in FIG. 2, system 200 may include a local storage device 202 in communication with a remote storage device 206 via a network 204. In one example, local storage device 202 may be programmed with one or more of modules 102 and/or may store all or a portion of interchangeable bitmaps 122 and replication configuration 126. Additionally or alternatively, remote storage device 206 may be programmed with one or more of modules 102 and/or may store all or part of interchangeable bitmaps 122 and replication configuration 126.

In one embodiment, one or more of modules 102 from FIG. 1 may, when executed by at least one processor of local storage device 202 and/or remote storage device 206, enable local storage device 202 and/or remote storage device 206 to add active volumes to existing replication configurations. For example, and as will be described in greater detail below, one or more of modules 102 may cause local storage device 202 and/or remote storage device 206 to (1) identify a new volume 212 to be added to an existing replication configuration 126, (2) use interchangeable bitmaps 122 to perform an initial synchronization of new volume 212, (3) determine that a replication log 128 associated with replication configuration 126 is capable of flagging future writes by an application to new volume 212 without overflowing, and (4) replicate new volume 212 to remote storage device 206 as part of existing replication configuration 126.

Local storage device 202 and remote storage device 206 generally represent any type or form of device that is capable of storing data and/or computer-readable information. Examples of local storage device 202 and remote storage device 206 include, without limitation, magnetic disk drives (e.g., so-called hard drives), solid state drives, magnetic tape drives, optical disk drives, storage arrays, cloud-based storage devices etc. In some examples, local storage device 202 and/or remote storage device 206 may represent a portion of a larger computing system, examples of which include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between local storage device 202 and remote storage device 206.

Figure 3:
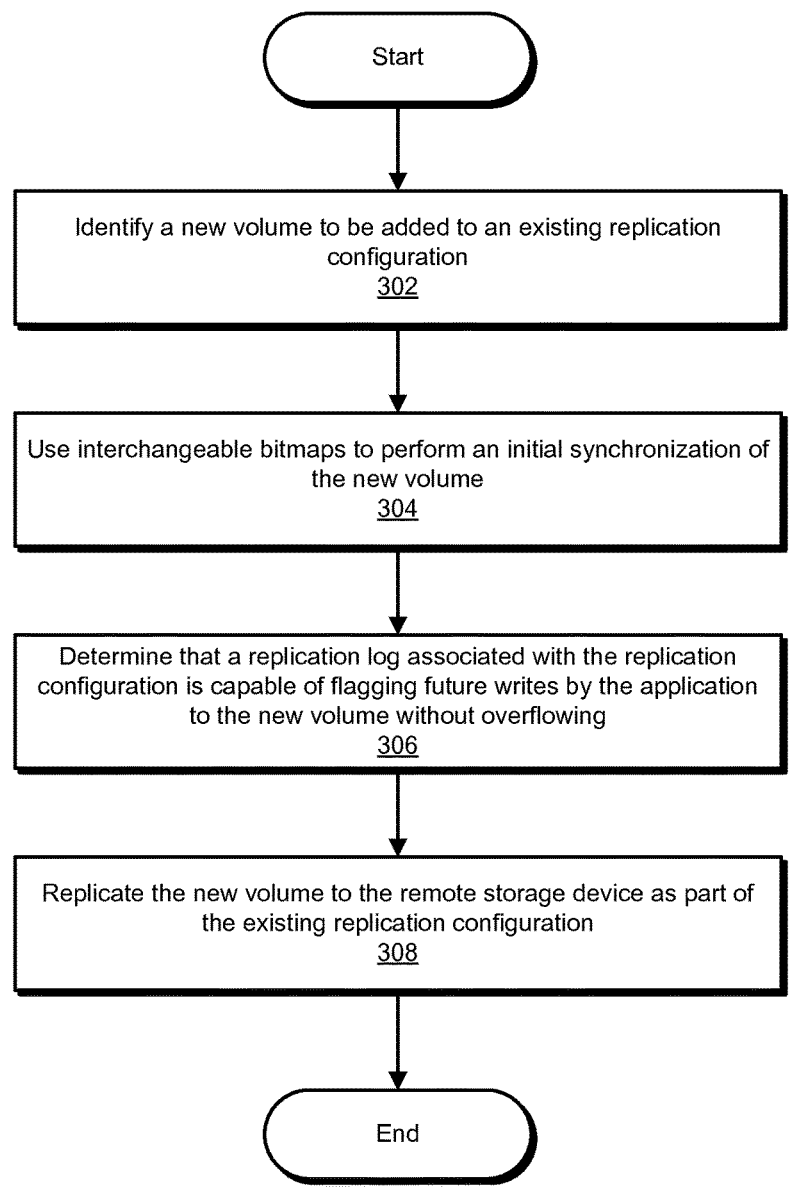
FIG. 3 is a flow diagram of an exemplary method for adding active volumes to existing replication configurations.

FIG. 3 is a flow diagram of an exemplary computer-implemented method 300 for adding active volumes to existing replication configurations. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a new volume to be added to an existing replication configuration. For example, identification module 104 may, as part of local storage device 202 in FIG. 2, identify a new volume 212 to be added to an existing replication configuration 126 that replicates a plurality of volumes to a remote storage device 206. In one example, the volume identified in step 302 may be in the process of being actively written to by an application.

As used herein, the term "volume" generally refers to any logical configuration for storing data. A "volume" may represent portions of a single volume or virtual machine or a plurality of volumes or virtual machines. Examples of volumes include, without limitation, collections of data, logical units, virtual disks for virtual machine files, storage devices (such as disks or disk groups), file systems, databases, and/or application programs and associated code libraries.

In addition, the term "replication," as used herein, generally refers to any process for creating and managing duplicate versions of a resource. For example, replication may refer to a process that automatically synchronizes changes or updates to a primary storage device with one or more target (or backup) storage devices to improve fault-tolerance, reliability, and/or accessibility. Additionally or alternatively, replication may refer to a process that automatically creates and synchronizes a copy of a virtual machine disk. In this example, the copy of the virtual machine may be stored locally within a cluster or at another site, thereby providing a data source for rapidly restoring the virtual machine.

Similarly, the term "replication configuration," as used herein, generally refers to any setting, organization, structure, and/or protocol used by computing systems involved in replication to perform a replication process. In some examples, this may include, without limitation, the choice of hardware and/or software for performing a replication process, the designation of various actors (such as primary or backup devices, etc.) within a replication process, the characteristics of a replication process (e.g., asynchronous versus synchronous), and/or any other required or useful configuration detail. In some examples, the replication configuration may be configured to replicate a plurality of volumes to a remote storage device. Additionally, the replication configuration may include a replication log that flags writes by one or more applications to a plurality of volumes, as explained in greater detail below.

Finally, the term "application," as used herein, generally refers to any computer-readable instruction capable of causing a computing device to perform a task. An example of such an application includes, without limitation, a database application configured to store data to new volume 212 on local storage device 202.

The systems described herein may perform step 302 in a variety of ways. For example, identification module 104 may, as part of local storage device 202 in FIG. 2, respond to a user request to add a new volume to an existing replication configuration. Additionally, or alternatively, identification module 104 may automatically identify new volumes as they are brought online or added to a storage configuration, such as local storage device 202.

Returning to FIG. 3, at step 304, one or more of the systems described herein may use interchangeable bitmaps to perform an initial synchronization of the new volume. For example, synchronization module 106 may, as part of local storage device 202 in FIG. 2, use interchangeable bitmaps 122 to perform an initial synchronization of new volume 212 before replicating new volume 212 to remote storage device 206 as part of existing replication configuration 126. In one example, new volume 212 may be in the process of being actively written to by an application while this initial synchronization is performed using interchangeable bitmaps 122.

As used herein, the term "bitmap" generally refers to any type or form of data structure capable of tracking changes made to a volume. For example, a bitmap may track changes made to a volume by flagging those regions of a volume that have changed since the most-recent replication operation. In one embodiment, a bitmap according to the instant disclosure may be composed of an array of bits, each of which may correspond to a particular region of a volume. In this embodiment, a bit within the bitmap may be set to logical 1 (one) if data in its respective region within the volume has changed. If the data in the respective region has not changed, however, the bit may be set to logical 0 (zero). As explained in greater detail below, in this embodiment only regions having a bit set to logical 1 will be replicated or copied to the remote storage device.

Similarly, the phrase "interchangeable bitmaps," as used herein, generally refers to a group of at least two bitmaps, each of which may be alternately used in connection with one of two roles; namely, (1) flagging writes that are made to a volume and (2) transferring flagged regions of a volume to a remote storage device.

As used herein, the term "initial synchronization" generally refers to any type or form of preliminary data-copying process, such as a process that involves copying at least an initial set of data from a volume to a target location. In some examples, and as will be described in greater detail below, this initial synchronization of the new volume may continue until a replication log associated with the replication configuration is determined to be capable of flagging future writes to the new volume without overflowing. Finally, "transferring" a region of a volume may refer to copying the data associated with that volume to a target location.

Figure 4:
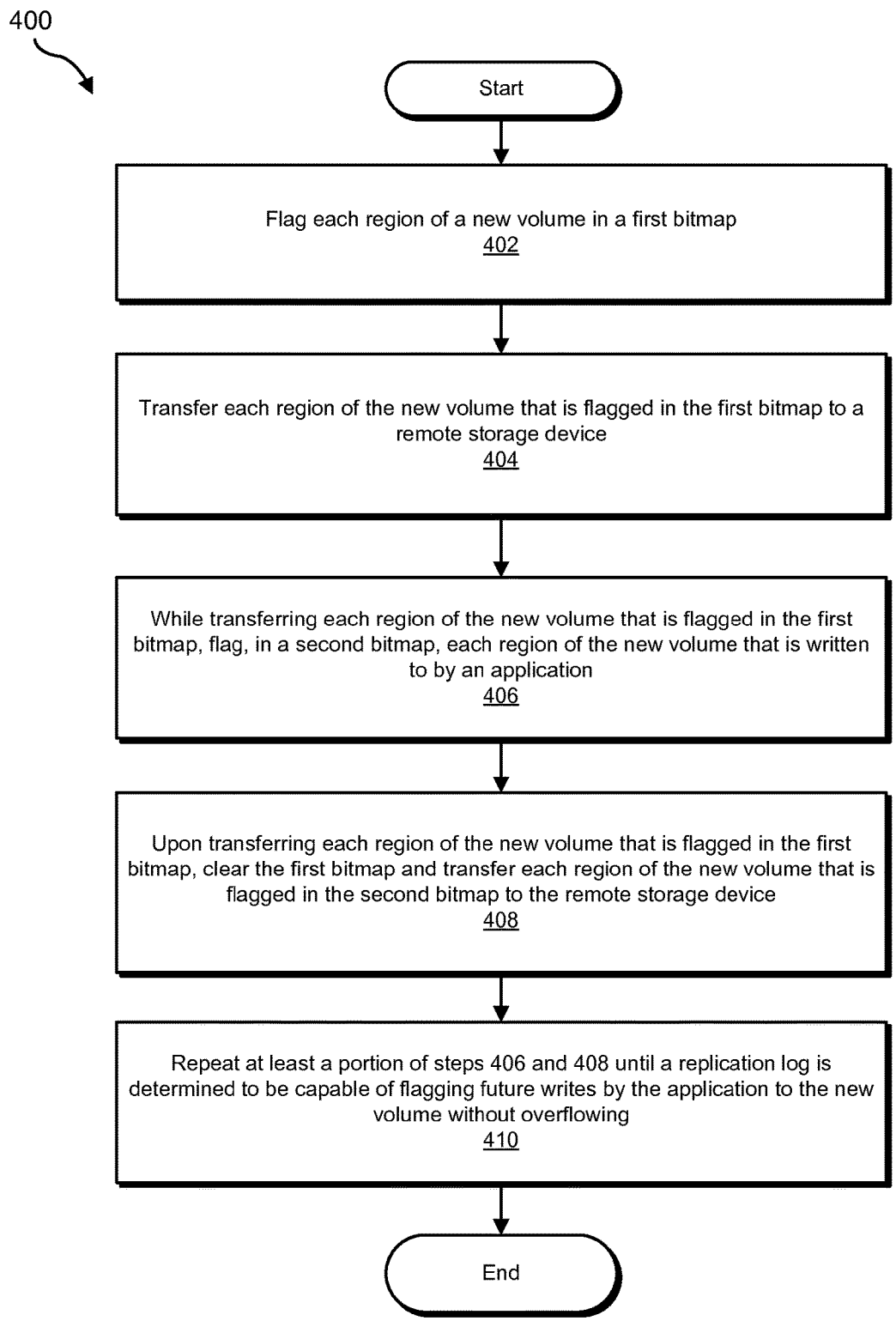
FIG. 4 is a flow diagram of an exemplary method for using interchangeable bitmaps to perform an initial synchronization of an active volume.

The systems described herein may perform step 304 in a variety of ways. In one embodiment, interchangeable bitmaps 122 may include a first bitmap 123 and a second bitmap 125. In this embodiment, and as illustrated in FIG. 4, first bitmap 123 may initially flag each region of new volume 212 as "dirty" (i.e., requiring synchronization) at step 402. Once this initial flagging is complete, first bitmap 123 and second bitmap 125 may be alternately used in connection with one of two roles until the initial synchronization of new volume 212 is complete; namely, (1) transferring the regions that the bitmap has flagged to remote storage device 206 or (2) flagging each region of new volume 212 that is written to by an application while the other bitmap is having its flagged regions transferred.

For example, once first bitmap 123 has flagged each region of new volume 212, synchronization module 106 may transfer each region of new volume 212 that is flagged in first bitmap 123 to remote storage device 206 (step 404). While synchronization module 106 is transferring each region of new volume 212 that is flagged in first bitmap 123, second bitmap 125 may flag each region of new volume 212 that is written to by an application (step 406).

Once synchronization module 106 has transferred each region of new volume that is flagged in first bitmap 123 to remote storage device 206, first bitmap 123 may be cleared (step 408). At this point, first bitmap 123 and second bitmap 125 may switch roles; i.e., synchronization module 106 may transfer each region of new volume 212 that is flagged in second bitmap 125 to remote storage device 206 and first bitmap 123 may flag each region of new volume 212 that is written to by the application while synchronization module 106 is transferring each region of new volume 212 that is flagged in second bitmap 125.

Once each region of new volume 212 that is flagged in second bitmap 125 is transferred, second bitmap 125 may be cleared. At this point, first bitmap 123 and second bitmap 125 may switch roles again; i.e., synchronization module 106 may transfer each region of new volume 212 that is flagged in first bitmap 123 and, while synchronization module 106 is transferring each region of new volume 212 that is flagged in first bitmap 123, second bitmap 125 may flag each region of new volume 212 that is written to by the application. Once each region of new volume 212 that is flagged in first bitmap 123 is transferred, first bitmap 123 may be cleared. First bitmap 123 and second bitmap 125 may continue to switch roles in this way until the initial synchronization is complete. In some embodiments, and as will be explained in greater detail below, at least a portion of the initial synchronization process illustrated in FIG. 4 may be repeated until determination module 108 determines that replication log 128 is capable of flagging future writes by the application to new volume 212 without overflowing (step 410).

Returning to FIG. 3, at step 306, one or more of the systems described herein may determine that a replication log associated with the replication configuration is capable of flagging future writes by the application to the new volume without overflowing. For example, determination module 108 may, as part of local storage device 202 in FIG. 2, determine that a replication log 128 associated with replication configuration 126 is capable of flagging future writes by an application to new volume 212 without overflowing.

As used herein, the term "replication log" generally refers to any type or form of data structure (such as a bitmap or buffer) capable of tracking changes made to one or more volumes. For example, a replication log may track changes made to a volume by flagging those regions of a volume that have changed since the most-recent replication operation. In one embodiment, a replication log according to the instant disclosure may be composed of an array of bits, each of which may correspond to a particular region of a particular volume. In this embodiment, a bit within the replication log may be set to logical 1 (one) if data in its respective region within the volume has changed. If the data in the respective region has not changed, however, the bit may be set to logical 0 (zero). In this embodiment, only regions having a bit set to logical 1 will be replicated or copied to the remote storage device.

In some examples, a replication log may refer to a fixed-size buffer that operates as if it were connected end-to-end. In these examples, when new data representing new changes to be tracked by a replication log exceeds the fixed-size of the buffer, the replication log will overwrite the oldest data maintained in the replication log with the new data. Similarly, the term "overflowing," as used herein, generally refers to an operation that exceeds the determined size of a replication log. In some examples, this may lead to erratic program behavior, such as overwriting data in a replication log that represents changed regions of volumes that have not yet been transferred to a remote storage device.

Determination module 108 may determine that replication log 128 is capable of flagging future writes by an application to new volume 212 without overflowing in step 306 in a variety of ways. In some embodiments, this determination may be based on the number of synchronized cycles that have occurred. For example, determination module 108 may determine that replication log 128 is capable of flagging future writes by an application to new volume 212 without overflowing if interchangeable bitmaps 122 have switched roles a predetermined number of times (e.g., twice). In some examples, this number may be predetermined. In other examples, this number may be dynamically determined based on a variety of factors.

In other embodiments, the determination may be based on the number of flagged regions of new volume 212 that still need to be transferred to remote storage device 206 to complete the initial synchronization. For example, determination module 108 may determine that replication log 128 is capable of flagging future writes by an application to new volume 212 without overflowing if the number of flagged regions of new volume 212 that still need to be transferred to remote storage device 206 is less than a predetermined number. In some examples, this number may be predetermined. In other examples, this number may be dynamically determined based on a variety of factors.

Figure 5:
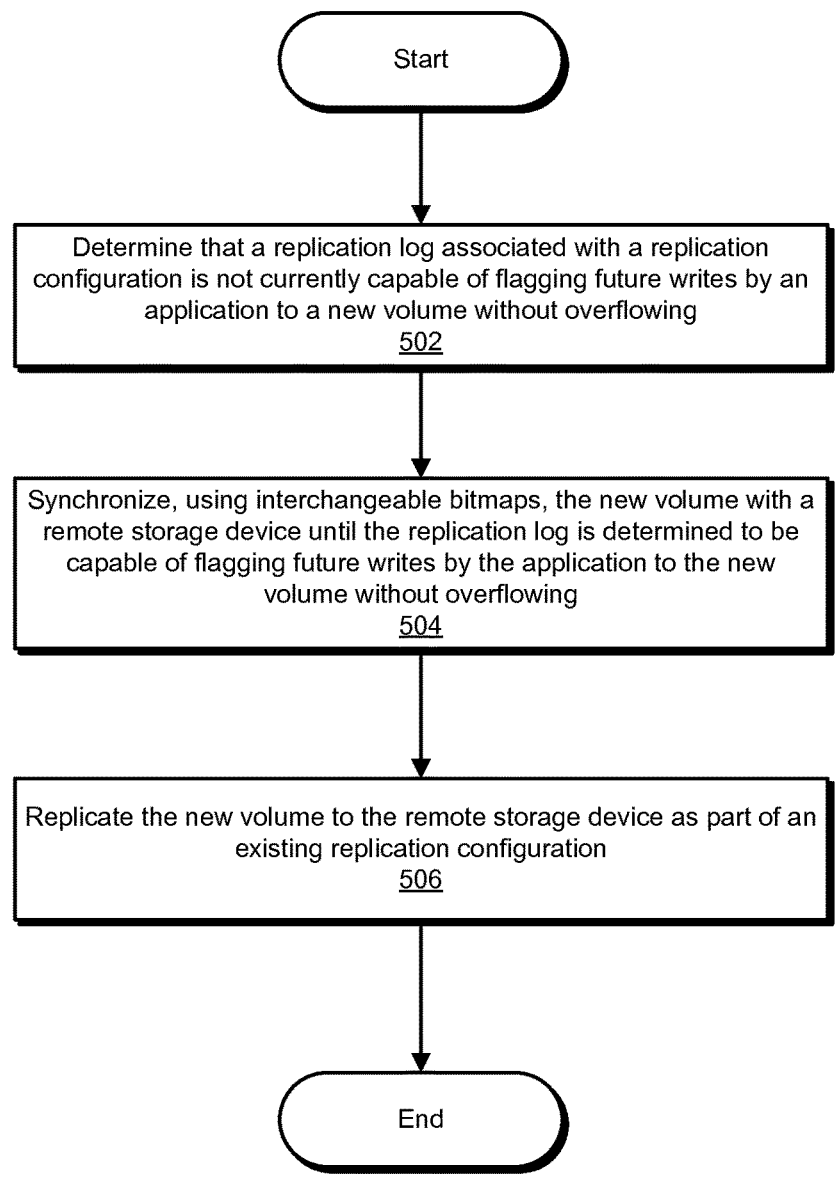
FIG. 5 is a flow diagram of an exemplary method for adding active volumes to existing replication configurations when a replication log is not capable of flagging future writes by an application to a new volume without overflowing.

In some embodiments, and as illustrated in FIG. 5, the systems described herein may, prior to performing step 306, determine that the replication log is not currently capable of flagging future writes by the application to the new volume without overflowing (step 502). The systems described herein may make this determination in a variety of ways. In one example, determination module 108 may proactively make this determination based on the number of flagged regions of new volume 212 that still need to be transferred to remote storage device 206. For example, determination module 108 may calculate the size of the data in first bitmap 123 or second bitmap 125 that represents changed regions of new volume 212 that have not yet been transferred to remote storage device 206 and determine that the size of replication log 128 is less than the calculated size. Additionally or alternatively, determination module 108 may retroactively make this determination by (1) flagging each region of new volume 212 that is flagged in first bitmap 123 or second bitmap 125 in replication log 128 and (2) determining that replication log 128 has overflown.

In embodiments where determination module 108 determines that replication log 128 is not currently capable of flagging future writes by the application to new volume 212 without overflowing, synchronization module 106 may use interchangeable bitmaps 122 to synchronize new volume 212 with remote storage device 206 until determination module 108 determines that replication log 128 is capable of flagging future writes by the application to new volume 212 without overflowing (step 504). Once determination module 108 determines that replication log 128 is capable of flagging future writes by the application to new volume 212 without overflowing, replication module 110 may replicate new volume 212 to remote storage device 206 as part of existing replication configuration 126 (step 506).

Returning to FIG. 3, at step 308, one or more of the systems described herein may replicate the new volume to the remote storage device as part of the existing replication configuration. For example, replication module 110 may, as part of local storage device 202 in FIG. 2, replicate new volume 212 to remote storage device 206 as part of replication configuration 126.

Figure 6:
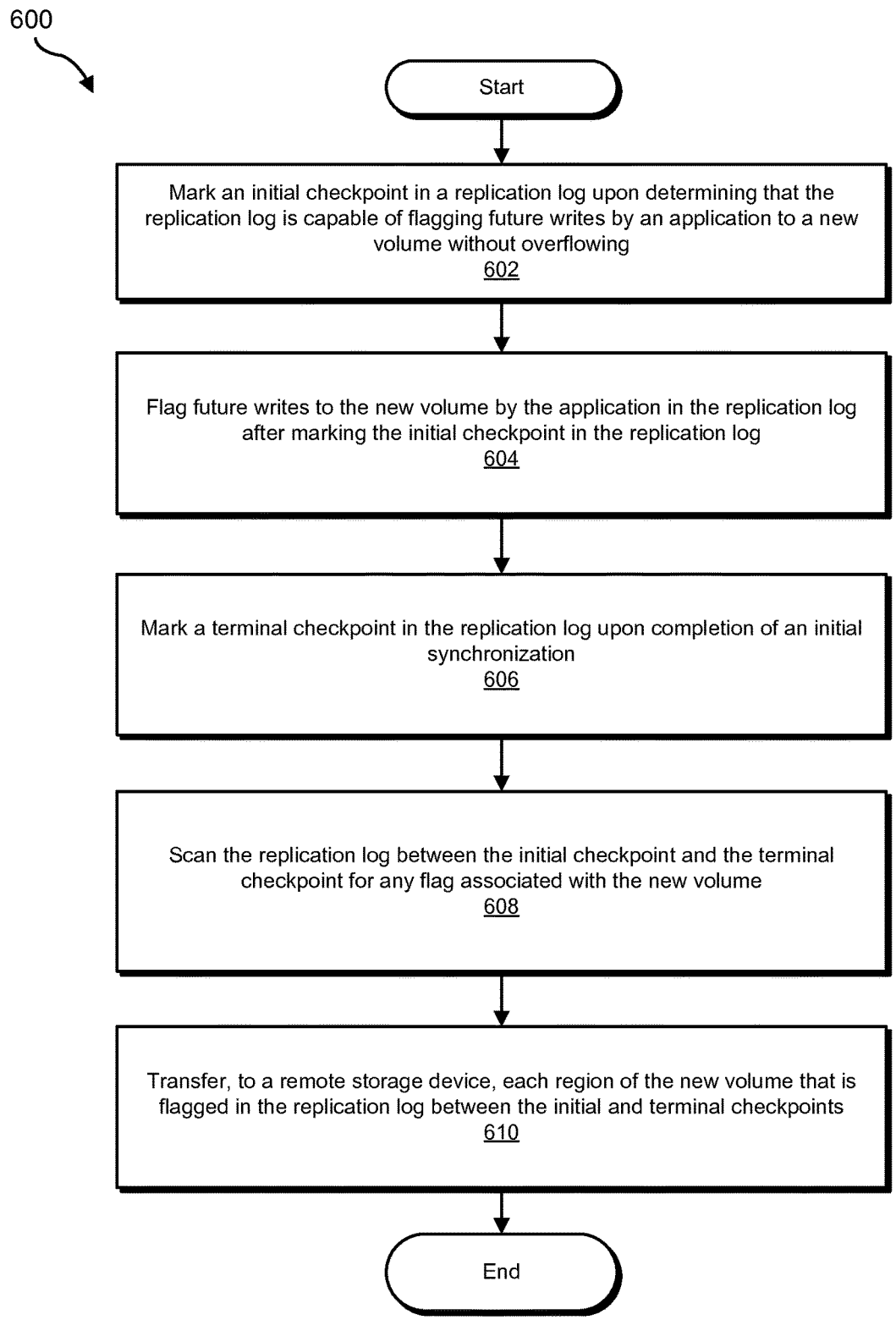
FIG. 6 is a flow diagram of an exemplary method for using checkpoints in a replication log.

In some examples, replication module 110 may replicate new volume 212 to remote storage device 206 as part of replication configuration 126 by tracking changes made to new volume 212 in replication log 128. Additionally or alternatively, and as illustrated in FIG. 6, replication module 110 may replicate new volume 212 to remote storage device 206 as part of replication configuration 126 by (1) marking an initial checkpoint in replication log 128 once determination module 108 determines that replication log 128 is capable of flagging future writes by an application to new volume 212 without overflowing (step 602), and, after marking the initial checkpoint, (2) flagging, in replication log 128, future writes to new volume 212 by the application (step 604). In this embodiment, replication module 110 may, upon completion of the initial synchronization process, (1) mark a terminal checkpoint in replication log 128 (step 606), (2) scan replication log 128 between the initial checkpoint and the terminal checkpoint for any flag associated with new volume 212 (step 608), and (3) transfer, to remote storage device 206, each region of new volume 212 that is flagged in replication log 128 between the initial and terminal checkpoints (step 610).

As explained above, by using interchangeable bitmaps to perform an initial synchronization of an actively used volume with a remote storage device before replicating the volume to the remote storage device as part of an existing replication configuration, the systems and methods described herein may enable system administrators to add volumes that are in active use by applications to existing replication configurations without offlining the applications. This may, in turn, both reduce the time in which the replication configuration remains inconsistent and consume fewer system resources. In addition, by performing this initial synchronization in parallel with the replication of the volumes that are part of the existing replication configuration, the systems and methods described herein may avoid negatively impacting the data consistency of the existing replication configuration.

Figure 7:
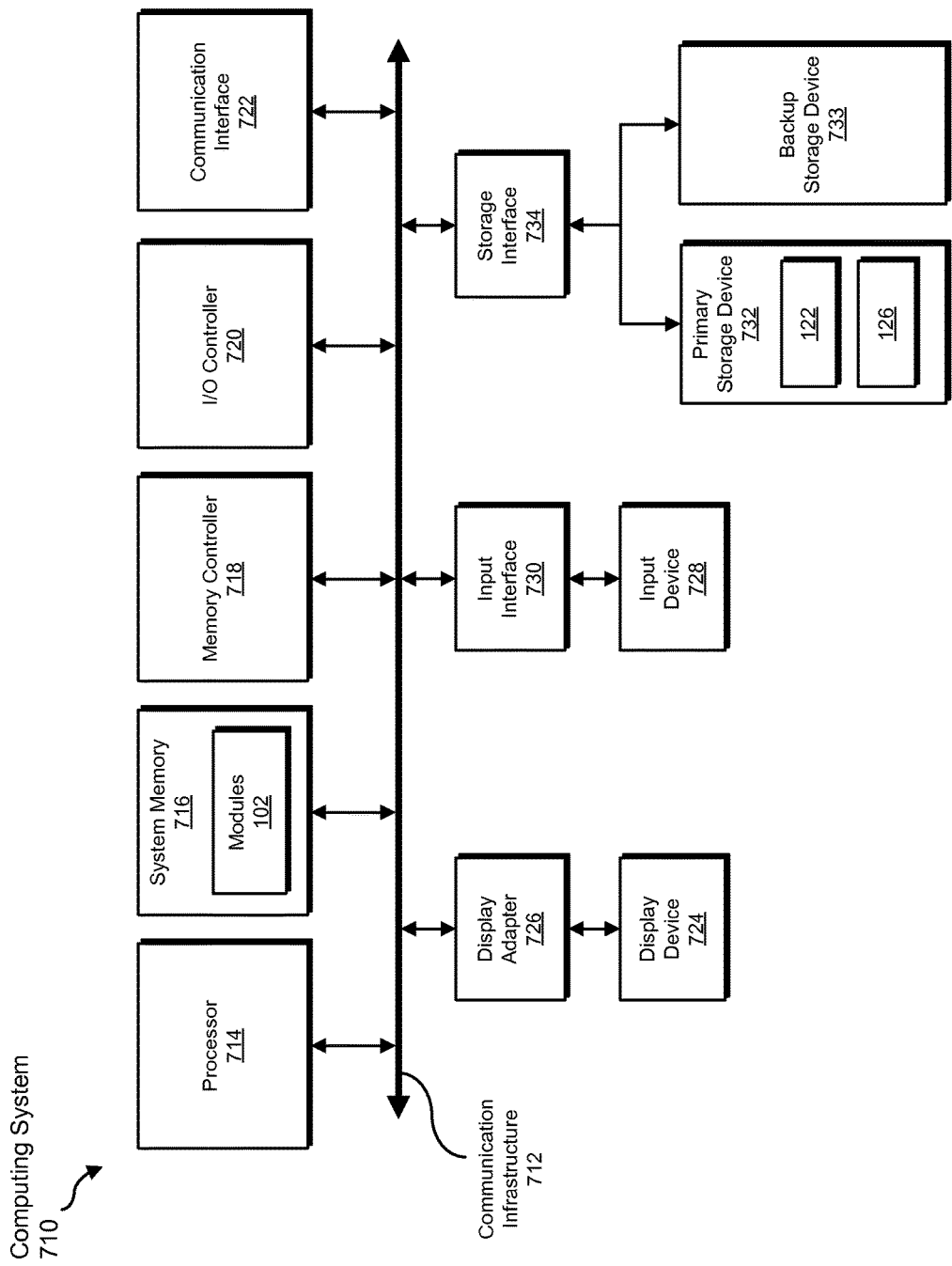
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In some examples, interchangeable bitmaps 122 and replication configuration 126 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
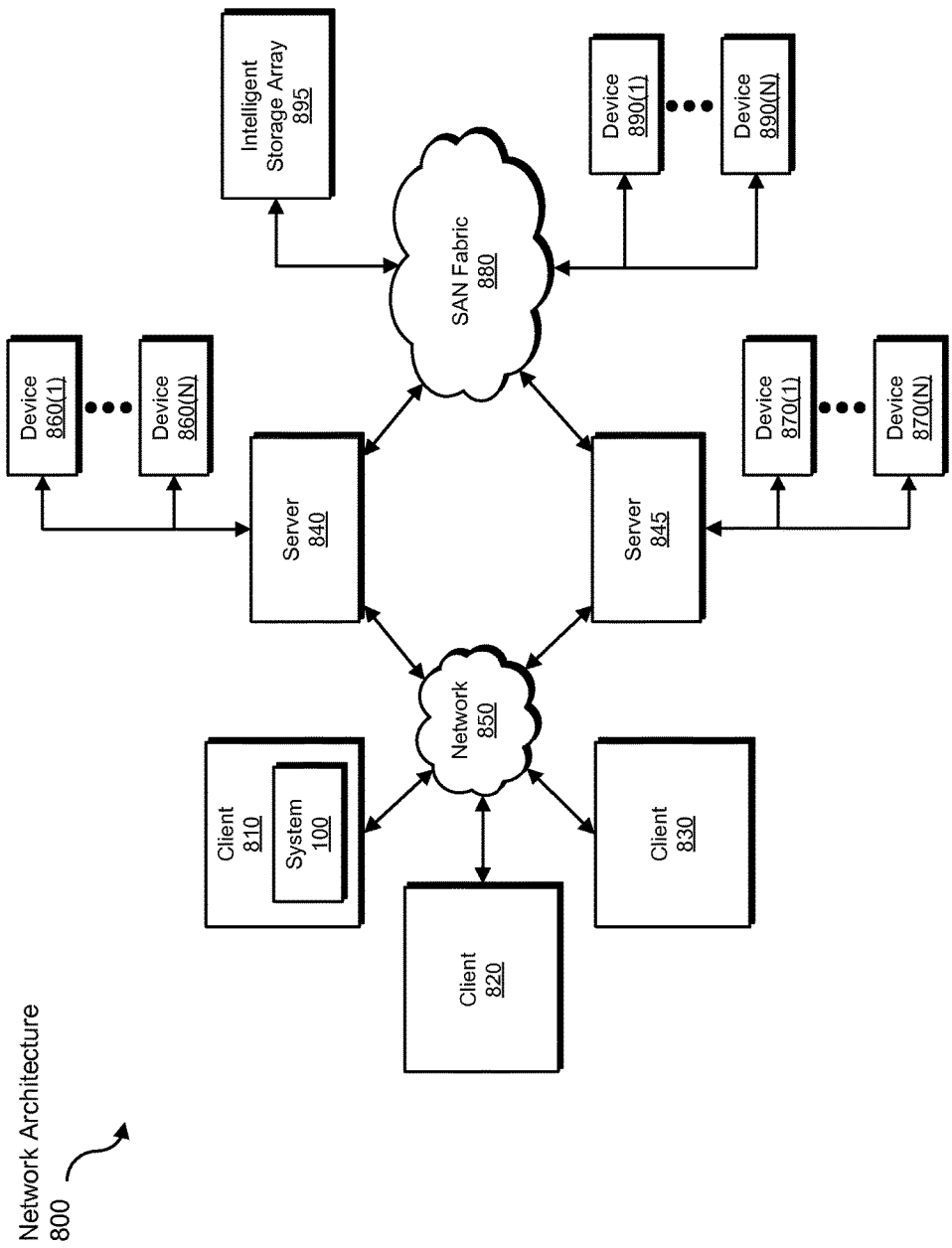
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for adding active volumes to existing replication configurations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a new volume containing data that is being actively written to by an application into a volume that is replicated to a remote device as part of a replication configuration. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for adding active volumes to existing replication configurations, at least a portion of the method being performed by a computing device comprising at least one processor, the method comprising:
    identifying a new volume to be added to an existing replication configuration that replicates a plurality of volumes to a remote storage device, wherein the new volume is being actively written to by at least one application;
    before replicating the new volume to the remote storage device as part of the existing replication configuration, and while the new volume is being actively written to by the application, using interchangeable bitmaps to perform an initial synchronization of the new volume with the remote storage device without offlining the new volume, wherein:
        the interchangeable bitmaps comprise a group of at least two bitmaps, each of which is configured to alternatively switch roles a predetermined number of times by switching between flagging writes that are made to the new volume and transferring flagged regions of the new volume to the remote storage device;
        using the interchangeable bitmaps to perform the initial synchronization of the new volume comprises:
            flagging each region of the new volume in a first bitmap;
            transferring each region of the new volume that is flagged in the first bitmap to the remote storage device;
            while transferring each region of the new volume that is flagged in the first bitmap, flagging, in a second bitmap, each region of the new volume that is written to by the application;
            upon transferring each region of the new volume that is flagged in the first bitmap, clearing the first bitmap and transferring each region of the new volume that is flagged in the second bitmap to the remote storage device;
            while transferring each region of the new volume that is flagged in the second bitmap, flagging, in the first bitmap or a third bitmap, each region of the new volume that is written to by the application;
            upon transferring each region of the new volume that is flagged in the second bitmap, clearing the second bitmap and transferring each region of the new volume that is flagged in the first bitmap or the third bitmap to the remote storage device;
    after the interchangeable bitmaps have switched roles the predetermined number of times, determining that a replication log associated with the replication configuration is capable of flagging future writes by the application to the new volume without overflowing based on the interchangeable bitmaps having switched roles the predetermined number of times;
    upon making the determination, replicating the new volume to the remote storage device as part of the existing replication configuration.

2. The computer-implemented method of claim 1, wherein the new volume comprises a virtual disk for a virtual machine.

3. The computer-implemented method of claim 2, wherein identifying the new volume comprises using an identification module, which is configured to automatically identify new volumes as the new volumes are brought online, to automatically identify the new volume in response to the new volume being brought online.

4. The computer-implemented method of claim 1, wherein the replication log comprises a fixed-size buffer.

5. The computer-implemented method of claim 1, wherein the steps of the method are performed in parallel with the replication of volumes that are part of the existing replication configuration.

6. The computer-implemented method of claim 1, wherein the remote storage device comprises a magnetic disk drive.

7. The computer-implemented method of claim 6, wherein the new volume comprises a database.

8. The computer-implemented method of claim 1, wherein replicating the new volume to the remote storage device as part of the existing replication configuration comprises:
    upon making the determination, marking an initial checkpoint in the replication log;
    after marking the initial checkpoint in the replication log, flagging, in the replication log, future writes to the new volume by the application;
    upon completion of the initial synchronization, marking a terminal checkpoint in the replication log;
    scanning the replication log between the initial checkpoint and the terminal checkpoint for any flag associated with the new volume;
    transferring, to the remote storage device, each region of the new volume that is flagged in the replication log between the initial and terminal checkpoints.

9. The computer-implemented method of claim 1, wherein the new volume comprises at least one of:
a logical unit;
a file system;
an application program.

10. The computer-implemented method of claim 1, wherein the remote storage device comprises a cloud-based storage device.

11. A system for adding active volumes to existing replication configurations, the system comprising:
a memory device;
an identification module, stored in the memory device, that identifies a new volume to be added to an existing replication configuration that replicates a plurality of volumes to a remote storage device, wherein the new volume is being actively written to by at least one application;
a synchronization module, stored in the memory device, that uses interchangeable bitmaps to perform an initial synchronization of the new volume with the remote storage device before the new volume is replicated to the remote storage device as part of the existing replication configuration and while the new volume is being actively written to by the application without offlining the new volume, wherein:
the interchangeable bitmaps comprise a group of at least two bitmaps, each of which is configured to alternatively switch roles a predetermined number of times by switching between flagging writes that are made to the new volume and transferring flagged regions of the new volume to the remote storage device;
the synchronization module uses the interchangeable bitmaps to perform the initial synchronization of the new volume by:
flagging each region of the new volume in a first bitmap;
transferring each region of the new volume that is flagged in the first bitmap to the remote storage device;
while transferring each region of the new volume that is flagged in the first bitmap, flagging, in a second bitmap, each region of the new volume that is written to by the application;
upon transferring each region of the new volume that is flagged in the first bitmap, clearing the first bitmap and transferring each region of the new volume that is flagged in the second bitmap to the remote storage device;
while transferring each region of the new volume that is flagged in the second bitmap, flagging, in the first bitmap or a third bitmap, each region of the new volume that is written to by the application;
upon transferring each region of the new volume that is flagged in the second bitmap, clearing the second bitmap and transferring each region of the new volume that is flagged in the first bitmap or the third bitmap to the remote storage device;
a determination module, stored in the memory device, that, after the interchangeable bitmaps have switched roles the predetermined number of times, determines that a replication log associated with the replication configuration is capable of flagging future writes by the application to the new volume without overflowing based on the interchangeable bitmaps having switched roles the predetermined number of times;
a replication module, stored in the memory device, that replicates the new volume to the remote storage device as part of the existing replication configuration upon the determination module making the determination;
at least one physical hardware processor that executes the identification, synchronization, determination, and replication modules.

12. The system of claim 11, wherein the new volume comprises a virtual disk for a virtual machine.

13. The system of claim 12, wherein:
the identification module is configured to automatically identify new volumes as the new volumes are brought online;
the identification module identifies the new volume by automatically identifying the new volume in response to the new volume being brought online.

14. The system of claim 11, wherein the replication log comprises a fixed-size buffer.

15. The system of claim 11, wherein the initial synchronization of the new volume is performed in parallel with the replication of volumes that are part of the existing replication configuration.

16. The system claim 11, wherein the remote storage device comprises a magnetic disk drive.

17. The system of claim 16, wherein the new volume comprises a database.

18. The system of claim 11, wherein the replication module replicates the new volume to the remote storage device as part of the existing replication configuration by:
upon the determination module making the determination, marking an initial checkpoint in the replication log;
after marking the initial checkpoint in the replication log, flagging, in the replication log, future writes to the new volume by the application;
upon completion of the initial synchronization by the synchronization module, marking a terminal checkpoint in the replication log;
scanning the replication log between the initial checkpoint and the terminal checkpoint for any flag associated with the new volume;
transferring, to the remote storage device, each region of the new volume that is flagged in the replication log between the initial and terminal checkpoints.

19. The system of claim 11, wherein:
the new volume comprises at least one of:
a logical unit;
a file system;
an application program.

20. A non-transitory computer-readable medium comprising one or more computer-executable instructions that, when executed by at least one processor of a computing device, cause the computing device to:
identify a new volume to be added to an existing replication configuration that replicates a plurality of volumes to a remote storage device, wherein the new volume is being actively written to by at least one application;
before replicating the new volume to the remote storage device as part of the existing replication configuration, and while the new volume is being actively written to by the application, use interchangeable bitmaps to perform an initial synchronization of the new volume with the remote storage device without offlining the new volume, wherein:
the interchangeable bitmaps comprise a group of at least two bitmaps, each of which is configured to alternatively switch roles a predetermined number of times by switching between flagging writes that are made to the new volume and transferring flagged regions of the new volume to the remote storage device;

using the interchangeable bitmaps to perform the initial synchronization of the new volume comprises:
- flagging each region of the new volume in a first bitmap;
- transferring each region of the new volume that is flagged in the first bitmap to the remote storage device;
- while transferring each region of the new volume that is flagged in the first bitmap, flagging, in a second bitmap, each region of the new volume that is written to by the application;
- upon transferring each region of the new volume that is flagged in the first bitmap, clearing the first bitmap and transferring each region of the new volume that is flagged in the second bitmap to the remote storage device;
- while transferring each region of the new volume that is flagged in the second bitmap, flagging, in the first bitmap or a third bitmap, each region of the new volume that is written to by the application;
- upon transferring each region of the new volume that is flagged in the second bitmap, clearing the second bitmap and transferring each region of the new volume that is flagged in the first bitmap or the third bitmap to the remote storage device;

after the interchangeable bitmaps have switched roles the predetermined number of times, determine that a replication log associated with the replication configuration is capable of flagging future writes by the application to the new volume without overflowing based on the interchangeable bitmaps having switched roles the predetermined number of times;

upon making the determination, replicate the new volume to the remote storage device as part of the existing replication configuration.

* * * * *